(12) United States Patent
Park et al.

(10) Patent No.: US 10,665,859 B2
(45) Date of Patent: May 26, 2020

(54) NEGATIVE ELECTRODE ACTIVE MATERIAL FOR SECONDARY BATTERY AND SECONDARY BATTERY INCLUDING THE SAME

(71) Applicant: LG Chem, Ltd., Seoul (KR)

(72) Inventors: Sung Bin Park, Daejeon (KR); Dong Hun Lee, Daejeon (KR); Hye Lim Jeon, Daejeon (KR); Wang Mo Jung, Daejeon (KR); Seong Hoon Kang, Daejeon (KR)

(73) Assignee: LG Chem, Ltd. (KR)

(*) Notice: Subject to any disclaimer, the term of this patent is extended or adjusted under 35 U.S.C. 154(b) by 363 days.

(21) Appl. No.: 15/746,910

(22) PCT Filed: Mar. 22, 2017

(86) PCT No.: PCT/KR2017/003088
§ 371 (c)(1),
(2) Date: Jan. 23, 2018

(87) PCT Pub. No.: WO2017/164650
PCT Pub. Date: Sep. 28, 2017

(65) Prior Publication Data
US 2020/0091511 A1    Mar. 19, 2020

(30) Foreign Application Priority Data

Mar. 22, 2016  (KR) .................. 10-2016-0034164
Mar. 22, 2017  (KR) .................. 10-2017-0036235

(51) Int. Cl.
*H01M 4/40*    (2006.01)
*H01M 10/0525*    (2010.01)
(Continued)

(52) U.S. Cl.
CPC ............ *H01M 4/405* (2013.01); *C01G 23/04* (2013.01); *H01M 4/131* (2013.01); *H01M 4/366* (2013.01);
(Continued)

(58) Field of Classification Search
CPC ...... H01M 4/366; H01M 4/505; H01M 4/525; H01M 4/405; H01M 4/131; H01M 10/525; C01G 23/04
(Continued)

(56) References Cited

U.S. PATENT DOCUMENTS 6,355,377 B1    3/2002  Sheem et al.
9,577,254 B2 *  2/2017  Nagai .................. H01M 4/131
(Continued)

FOREIGN PATENT DOCUMENTS

JP   2009117241 A  *  5/2009
KR   2010087559 A     9/2001
(Continued)

OTHER PUBLICATIONS

Extended European Search Report for Application No. EP17770620.7 dated May 30, 2018.
(Continued)

*Primary Examiner* — Amanda C. Walke
(74) *Attorney, Agent, or Firm* — Lerner, David, Littenberg, Krumholz & Mentlik, LLP

(57) ABSTRACT

The present invention provides a negative electrode active material for a secondary battery, the negative electrode active material including a core that includes a lithium titanium oxide and a surface treatment layer located on a surface of the core, wherein the surface treatment layer includes a boron-containing lithium oxide at an amount that allows a boron content to have a molar ratio of 0.002 to 0.02 with respect to 1 mole of the lithium titanium oxide, and
(Continued)

when 2 g of the negative electrode active material is titrated at pH 5 or lower using 0.1 M HCl, a titrated amount is 0.9 to 1.5 ml, and a secondary battery including the same. The negative electrode active material exhibits an excellent capacity recovery rate and an output characteristic when applied to a battery and is capable of reducing gas generation by preventing electrolyte decomposition.

11 Claims, 11 Drawing Sheets

(51) Int. Cl.
    *H01M 4/131*     (2010.01)
    *H01M 4/505*     (2010.01)
    *H01M 4/36*     (2006.01)
    *H01M 4/525*     (2010.01)
    *C01G 23/04*     (2006.01)
    *H01M 4/02*     (2006.01)

(52) U.S. Cl.
    CPC ........... *H01M 4/505* (2013.01); *H01M 4/525* (2013.01); *H01M 10/0525* (2013.01); *H01M 2004/027* (2013.01)

(58) Field of Classification Search
    USPC ...................................................... 429/231.1
    See application file for complete search history.

(56) References Cited

U.S. PATENT DOCUMENTS

| | | | |
|---|---|---|---|
| 9,653,725 B2* | 5/2017 | Nagai | C01G 53/50 |
| 10,355,273 B2* | 7/2019 | Kuriyama | H01M 10/0568 |
| 10,535,973 B2* | 1/2020 | Kliner | H01S 3/094007 |
| 2004/0258836 A1* | 12/2004 | Besenhard | B82Y 30/00 |
| | | | 427/180 |
| 2011/0086271 A1 | 4/2011 | Lee et al. | |
| 2011/0200880 A1 | 8/2011 | Yu | |
| 2014/0113197 A1 | 4/2014 | Xiao et al. | |
| 2014/0322579 A1 | 10/2014 | Mitsuhashi et al. | |
| 2014/0377656 A1 | 12/2014 | Lim et al. | |
| 2016/0013476 A1 | 1/2016 | Oh et al. | |
| 2018/0069231 A1* | 3/2018 | Kim | H01M 10/0525 |
| 2018/0233741 A1* | 8/2018 | Park | H01G 11/04 |
| 2019/0280291 A1* | 9/2019 | Pan | H01M 4/382 |
| 2020/0044241 A1* | 2/2020 | Gigler | H01M 4/625 |

FOREIGN PATENT DOCUMENTS

| | | |
|---|---|---|
| KR | 20080112809 A | 12/2008 |
| KR | 20110040478 A | 4/2011 |
| KR | 101140866 B1 | 5/2012 |
| KR | 20130117709 A | 10/2013 |
| KR | 20140098152 A | 8/2014 |

OTHER PUBLICATIONS

Search report from International Application No. PCT/KR2017/003088, dated Jul. 10, 2017.

* cited by examiner

NEGATIVE ELECTRODE ACTIVE MATERIAL FOR SECONDARY BATTERY AND SECONDARY BATTERY INCLUDING THE SAME

CROSS-REFERENCE TO RELATED APPLICATIONS

The present application claims is a national phase entry under 35 U.S.C. § 371 of International Application No. PCT/KR2017/003088 filed Mar. 22, 2017, which claims priority from Korean Patent Application No. 2016-0034164, filed on Mar. 22, 2016 and Korean Patent Application No. 2017-0036235, filed on Mar. 22, 2017, in the Korean Intellectual Property Office, the disclosures of which are incorporated herein in their entirety by reference.

TECHNICAL FIELD

Technical Field

The present invention relates to a negative electrode active material for a secondary battery that exhibits an excellent capacity recovery rate and an output characteristic when applied to a battery and is capable of reducing gas generation by preventing electrolyte decomposition, and a lithium secondary battery including the same.

Background Art

As technology development and demand for mobile devices increase, demand for secondary batteries as energy sources is sharply increasing. Among the secondary batteries, a lithium secondary battery that has a high energy density, a long cycle lifespan, and a low self-discharge rate is commercialized and being widely used. Particularly, due to recent expansion of the market from small-sized lithium secondary batteries used in portable devices to large-sized secondary batteries used in vehicles, technologies for increasing a capacity and output of a negative electrode active material are required.

Although a carbonaceous material, graphite in particular, capable of reverse intercalation and deintercalation of lithium ions while maintaining structural and electrical properties has been mainly used as a negative electrode active material in a conventional negative electrode of a lithium secondary battery, a large amount of research is being carried out on a Li alloy negative electrode material using silicon (Si) and tin (Sn) having a larger theoretical capacity than graphite and a lithium oxide negative electrode material such as a lithium titanium oxide due to a recent increase in demand for high-capacity batteries.

Among the above, the lithium titanium oxide is a zero-strain material in which a structural change is extremely small during charging/discharging and has an excellent lifespan characteristic, forms a relatively high voltage range, and does not cause generation of dendrite, thereby having excellent safety and stability.

However, because the lithium titanium oxide has a higher operating voltage than an electrolyte decomposition voltage, a solid electrolyte interface (SEI) layer is not formed. Consequently, in a case of a lithium secondary battery to which the lithium titanium oxide is applied, an electrolyte decomposition phenomenon continuously occurs as charging/discharging is performed, an electrolyte is depleted as a result, and there is a problem in that a lifespan characteristic is deteriorated. Also, in the case of the lithium secondary battery to which the lithium titanium oxide is applied, there is a problem in that a large amount of gas is generated when the lithium secondary battery is left at high temperature.

DISCLOSURE

Technical Problem

A first technical object of the present invention is to provide a negative electrode active material for a secondary battery that exhibits an excellent capacity recovery rate and an output characteristic when applied to a battery and is capable of reducing gas generation by preventing electrolyte decomposition, and a method of fabricating the same.

A second technical object of the present invention is to provide a negative electrode for a secondary battery, a lithium secondary battery, a battery module, and a battery pack including the negative electrode active material.

Technical Solution

To achieve the above objects, according to an embodiment of the present invention, there is provided a negative electrode active material for a secondary battery, the negative electrode active material including a core that includes a lithium titanium oxide and a surface treatment layer located on a surface of the core, wherein the surface treatment layer includes a boron-containing lithium oxide at an amount that allows a boron content to have a molar ratio of 0.002 to 0.02 with respect to 1 mole of the lithium titanium oxide, and when 2 g of the negative electrode active material is titrated at pH 5 or lower using 0.1 M HCl, a titrated amount is 0.9 to 1.5 ml.

According to another embodiment of the present invention, there is provided a method of fabricating the above-described negative electrode active material for a secondary battery, the method including a step of forming, on a surface of a core, a surface treatment layer including a boron-containing lithium oxide at an amount that allows a boron content to have a molar ratio of 0.002 to 0.02 with respect to 1 mole of a lithium titanium oxide by treating a surface of the core including the lithium titanium oxide with a precursor of the boron-containing lithium oxide and then heat-treating at 350° C. to 450° C.

According to still another embodiment of the present invention, there is provided a negative electrode for a secondary battery and a lithium secondary battery including the above-described negative electrode active material.

Other details of the embodiments of the present invention are included in the detailed description below.

Advantageous Effects

According to the present invention, a negative electrode active material for a secondary battery can exhibit an excellent capacity recovery rate. Also, the negative electrode active material can improve an output characteristic by preventing a decrease in resistance due to a lithium by-product generated in a process of fabricating a core, can reduce gas generation by a surface treatment layer preventing electrolyte decomposition, and particularly, can reduce electrolyte decomposition and gas generation due to elution of titanium ions ($Ti^{4+}$) at a low state of charge (SOC).

DESCRIPTION OF DRAWINGS

Because the following drawings attached to the present specification illustrate exemplary embodiments of the present invention and serve to facilitate understanding of the technical idea of the present invention together with the above-described content of the invention, the present invention should not be limitedly interpreted on the basis of the drawings.

BEST MODE

Figure 1:
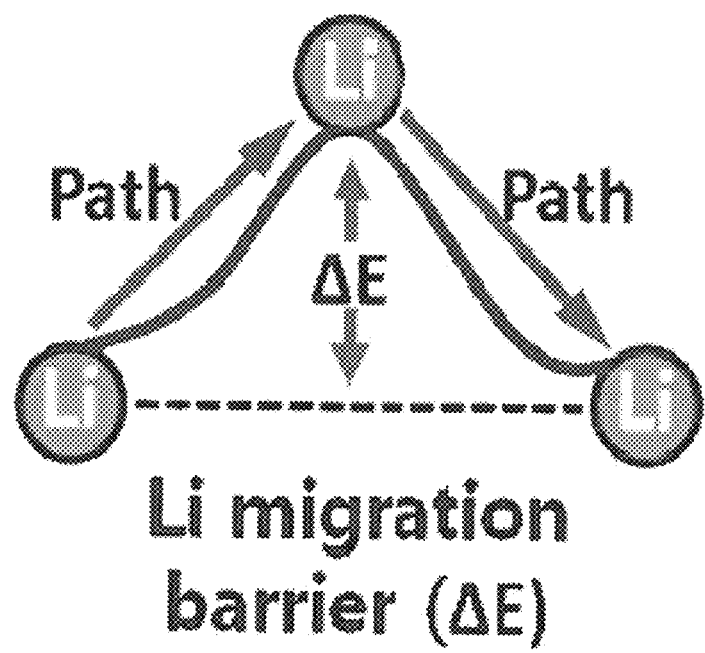
FIG. 1 is a schematic diagram schematically illustrating a generation mechanism of a lithium ion migration energy barrier.

Hereinafter, the present invention will be described in more detail to assist understanding of the present invention.

Terms or words used in the present specification and claims are not to be limitedly interpreted as general or dictionary meanings and should be interpreted as meanings and concepts that are consistent with the technical idea of the present invention on the basis of the principle that an inventor may properly define concepts of terms to describe his or her invention in the best way.

In a negative electrode active material having a surface treatment layer, electrical conductivity in the surface treatment layer is related to surface resistance of the negative electrode active material and a side reaction with an electrolyte. Specifically, when the electrical conductivity in the surface treatment layer is low, the surface resistance may increase whereas the side reaction with the electrolyte may decrease. Generally, boron (B) is an insulator and has low electrical conductivity. Accordingly, it is preferable that a content of boron included in the surface treatment layer be properly controlled to prevent a side reaction with an electrolyte while decreasing the surface resistance of the negative electrode active material and improving an output characteristic as a result.

Regarding this, in the present invention, when fabricating a negative electrode active material, by forming a surface treatment layer of a boron-containing lithium oxide on a surface of a core including a lithium titanium oxide such that a content of the boron-containing lithium oxide is controlled on the basis of a total weight of the lithium titanium oxide forming the core in consideration of both the electrical conductivity in the surface treatment layer and the effect of suppressing a side reaction with an electrolyte, the balance between lithium ion conductivity and electrical conductivity in the surface treatment layer may be improved.

Specifically, the negative electrode active material for a secondary battery according to an embodiment of the present invention includes a core including a lithium titanium oxide and a surface treatment layer located on a surface of the core, wherein the surface treatment layer includes a boron-containing lithium oxide at an amount that allows a boron content to have a molar ratio of 0.002 to 0.02 with respect to 1 mole of the lithium titanium oxide, and when 2 g of the negative electrode active material is titrated at pH 5 or lower using 0.1 M HCl, a titrated amount is 0.9 to 1.5 ml.

The surface treatment layer including the boron-containing lithium oxide is formed by a precursor of the boron-containing lithium oxide such as boric acid reacting with lithium impurities present on the surface of the core and a lithium raw material that is further added in the fabrication process. While a content of the lithium impurities in the core may be reduced due to formation of the surface treatment layer, the balance between lithium ion conductivity and electrical conductivity in the surface treatment layer may be improved due to optimization of a boron content. Also, due to formation of the surface treatment layer having the above constitution, electrolyte decomposition is prevented at the surface of the core including the lithium titanium oxide, and thus an excellent capacity recovery rate may be exhibited. Further, because the electrolyte decomposition is prevented due to the surface treatment layer, a gas generation amount may be reduced, and particularly, electrolyte decomposition and gas generation due to elution of titanium ions ($Ti^{4+}$) at a low state of charge (SOC) may be reduced. By the surface treatment layer evenly covering the entire surface of the core without an occurrence of recrystallization, a decrease in resistance due to a lithium by-product generated in a process of fabricating the core may be prevented, and thus the output characteristic may be improved.

In the present invention, the capacity recovery rate refers to an average discharge capacity of the second and third cycles excluding an initial discharge capacity when a battery is fully charged, stored for a week at 80° C., discharged, and then charged and discharged again under the same charging and discharging conditions.

Specifically, in the negative electrode active material according to an embodiment of the present invention, the surface treatment layer including the boron-containing lithium oxide may include the boron-containing lithium oxide at an amount that allows a boron content to have a molar ratio of 0.002 to 0.02 with respect to 1 mole of the lithium titanium oxide constituting the core. When the molar ratio of the boron content with respect to the lithium titanium oxide is less than 0.002, the improvement effect due to the formation of the surface treatment layer is insignificant, and when the molar ratio of the boron content exceeds 0.02, an increase in surface resistance and deterioration of an output characteristic of a battery may be caused by deterioration of electrical conductivity in the surface treatment layer. More specifically, the surface treatment layer may include the boron-containing lithium oxide at an amount that allows the boron-containing lithium oxide to be 5,000 to 7,000 ppm with respect to a total weight of the lithium titanium oxide.

In the present invention, the content of boron included in the surface treatment layer may be analyzed using an inductively coupled plasma (ICP) optical emission spectrometer.

A lithium ion migration energy barrier ($E_{barrier}$) may be predicted from a lithium ion diffusion path in a material forming the surface treatment layer.

Figure 2:
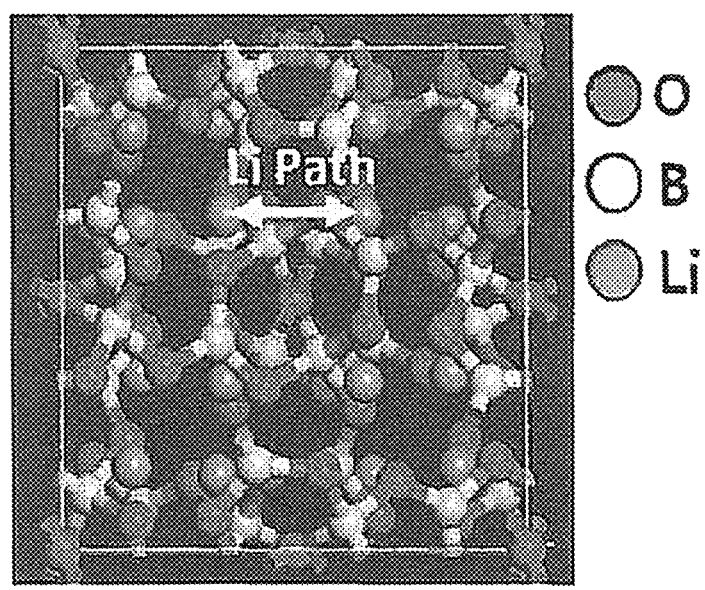
FIG. 2 is a schematic diagram schematically illustrating a migration path of lithium ions in a crystal structure of $Li_2B_4O_7$.
Figure 3:
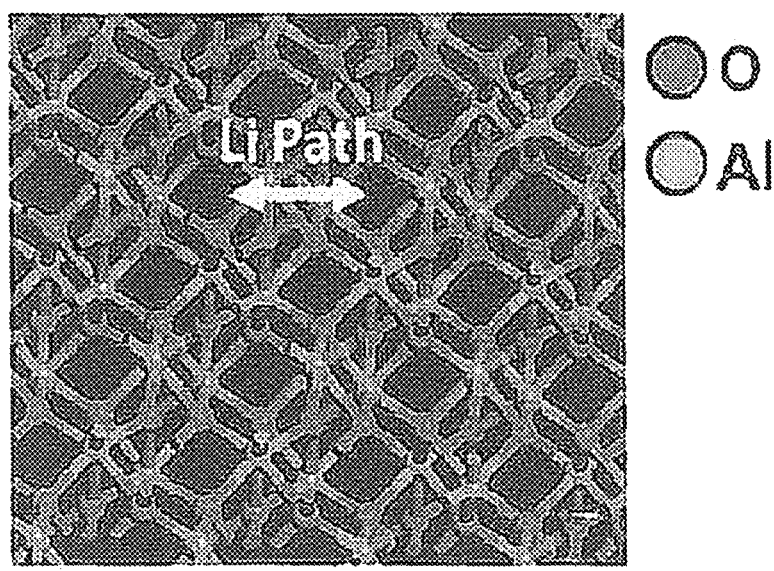
FIG. 3 is a schematic diagram schematically illustrating a migration path of lithium ions in a crystal structure of $Al_2O_3$.

FIG. 1 is a schematic diagram schematically illustrating a generation mechanism of a lithium ion migration energy barrier, and FIGS. 2 and 3 are schematic diagrams schematically illustrating crystal structures of $Li_2B_4O_7$ and $Al_2O_3$, respectively. FIGS. 1 to 3 are merely examples for describing the present invention, and the present invention is not limited thereto.

As illustrated in FIG. 1, as a lithium ion migration energy barrier value is lower, lithium ion migration is facilitated, which indicates excellent lithium ion conductivity. Both boron and aluminum are insulating materials and have low electrical conductivity. As a result, boron and aluminum are mainly used as surface treating agents for an active material due to being capable of suppressing a side reaction with an electrolyte and improving safety of the active material by increasing resistance at an interface of a negative electrode. However, as illustrated in FIGS. 2 and 3, $Li_2B_4O_7$, which is a typical example of a boron-containing lithium oxide, has a longer lithium ion migration path in a crystal structure in comparison to $Al_2O_3$, which is generally used in forming the surface treatment layer. Accordingly, the lithium ion migration is facilitated in comparison to $Al_2O_3$ having relatively more lithium ions between crystals, and as a result, $Li_2B_4O_7$ may exhibit a lower lithium ion migration energy barrier value and superior lithium ion conductivity.

Generally, an $E_{barrier}$ value of a boron-containing lithium oxide is about 0.05 eV to 0.45 eV. Such an $E_{barrier}$ value of the boron-containing lithium oxide is due to a difference in lithium ion migration paths in crystal structures, and this may be controlled in accordance with a heat treatment during the fabrication. Here, when the heat treatment temperature is too high and thus the $E_{barrier}$ value is too large, the effect of reducing gas and the effect of improving the output characteristic may be deteriorated due to a decrease in a surface covering rate caused by recrystallization of the boron-containing lithium oxide. Particularly, the $E_{barrier}$ value increases as a heat treatment at high temperature is further performed when forming the surface treatment layer. Here, recrystallization occurs, and as a result, the output characteristic may be further deteriorated and the effect of reducing gas generation may be further decreased due to deterioration of the surface covering rate.

In the negative electrode active material according to an embodiment of the present invention, the surface treatment layer may be formed of a single boron-containing lithium oxide or formed of a mixture of two or more types of boron-containing lithium oxides. In the present invention, by controlling types or a mixing ratio of boron-containing lithium oxides forming the surface treatment layer under a condition that satisfies the above-mentioned boron content range in the surface treatment layer, lithium ion conductivity in the surface treatment layer may be improved.

Specifically, in the negative electrode active material according to an embodiment of the present invention, the surface treatment layer may have an $E_{barrier}$ value of 0.05 eV to 0.3 eV, more specifically, 0.05 eV to 0.2 eV. When the $E_{barrier}$ value in the surface treatment layer is less than 0.05 eV, the fabrication itself may be difficult, and when the $E_{barrier}$ value exceeds 0.3 eV, the effect of reducing gas and the effect of improving the output characteristic may be deteriorated due to a decrease in the surface covering rate caused by the recrystallization of the boron-containing lithium oxide.

In the present invention, the $E_{barrier}$ value may be obtained through a first principle calculation using the Vienna Ab initio simulation package (VASP) program.

Specifically, the boron-containing lithium oxide constituting the surface treatment layer may be a compound of Chemical Formula 1 below:

$$Li_aB_bO_{(a+3b)/2}$$ [Chemical Formula 1]

In Chemical Formula 1 above, 1≤a≤4 and 1≤b≤8.

Specific examples of the boron-containing lithium oxide may include $Li_2B_4O_7$, $LiB_3O_5$, $LiB_8O_{13}$, $Li_4B_2O_5$, $Li_3BO_3$, $Li_2B_2O_4$, $Li_2B_6O_{10}$, or the like and may include any one of the above or a mixture of two or more of the above.

More specifically, the boron-containing lithium oxide may have an $E_{barrier}$ value of 0.05 eV to 0.3 eV, and even more specifically, the boron-containing lithium oxide may have a bandgap of 8.5 eV to 10.5 eV while satisfying the above-mentioned $E_{barrier}$ value. In this way, by simultaneously satisfying conditions of the $E_{barrier}$ value and the bandgap value, the surface treatment layer with excellent balance between ion conductivity and electrical conductivity may be formed with a higher covering rate. More specifically, the boron-containing lithium oxide may have a bandgap of 8.9 eV to 10.1 eV.

In the present invention, the bandgap of the boron-containing lithium oxide may be measured using cyclic voltammetry.

The surface treatment layer is preferably formed with a proper thickness in consideration of a particle size of the core that determines a capacity of the negative electrode active material. Specifically, the surface treatment layer may be formed with an average thickness ratio of 0.01 to 0.1 with respect to a radius of the core under a condition that satisfies the above-mentioned boron content. When the thickness ratio of the surface treatment layer is less than 0.01, the thickness of the surface treatment layer may be extremely thin, and the effect of suppressing a side reaction between the negative electrode active material and the electrolyte during charging and discharging may be insignificant. When the thickness ratio of the surface treatment layer exceeds 0.1, there is a concern about deterioration of the output characteristic due to an increase in resistance caused by the extremely thick surface treatment layer.

In the present invention, the particle size of the core and the thickness of the surface treatment layer may be measured through a particle cross-section analysis using forced ion beam (FIB).

The surface treatment layer may be formed throughout the surface of the core or partially formed. More specifically, the surface treatment layer may be formed at 80% or more of the entire surface area of the core under a condition that satisfies the above-mentioned boron content range. Even more specifically, in consideration of the effect of preventing electrolyte decomposition at the surface of the core, the surface treatment layer may be formed at 100% of the entire surface area of the core, that is, throughout the surface of the core.

In the negative electrode active material for a secondary battery according to the present invention, the core includes the lithium titanium oxide.

Specifically, the lithium titanium oxide may be a compound of Chemical Formula 2 below:

$$Li_xTi_yM_wO_{12-z}A_z \qquad \text{[Chemical Formula 2]}$$

In Chemical Formula 2 above, $0.5 \le x \le 4$, $1 \le y \le 5$, $0 \le w \le 0.17$, $0 \le z \le 0.17$, M includes one or more elements selected from the group consisting of metals of Groups 2 to 13 in the periodic table. Specifically, M may be any one or more selected from the group consisting of Al, Ni, Co, Fe, Mn, V, Cr, Ti, W, Ta, Mg, and Mo. A may be a nonmetal element having an oxidation number of −1 valence. Specifically, A may be any one or more selected from the group consisting of F, Cl, Br, and I.

The composition of the lithium titanium oxide of Chemical Formula 2 above is an average composition of the entire core.

More specifically, the lithium titanium oxide may be $Li_4Ti_5O_{12}$, $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$, or the like, and any one of the above or a mixture of two or more of the above may be used as the lithium titanium oxide.

The lithium titanium oxide may be a single particle whose average particle size ($D_{50}$) is 0.1 μm to 5 μm or may be a secondary particle that is formed by condensation of fine primary particles having an average particle size of 200 nm to 1,000 nm and has an average particle size ($D_{50}$) of 3 μm to 20 μm. In a case in which the lithium titanium oxide is a single particle, there may be a concern about deterioration of structural stability and deterioration of a capacity characteristic when the average particle size thereof is less than 0.1 μm, and the output characteristic of the secondary battery may be deteriorated when the average particle diameter exceeds 5 μm.

In the present invention, the average particle size ($D_{50}$) of the core particle may be defined as a particle size based on a particle size distribution at 50%. An average particle size ($D_{50}$) of the core particle may be measured using, for example, a laser diffraction method. More specifically, during the measurement using the laser diffraction method, the core particle may be dispersed in a solvent, the dispersed particle may be introduced into a commercially available laser diffraction particle size measurement device (for example, Microtrac MT 3000), and then an ultrasonic wave of about 28 kHz may be radiated with an output of 60 W to calculate the average particle size ($D_{50}$) based on a particle size distribution at 50% in the measurement device.

In the core, some of the boron (B) element of the boron-containing lithium oxide may be doped at a surface side of the particle, specifically, an interface in contact with the surface treatment layer and a region corresponding to a distance 0% to less than 100% with respect to a radius of the core particle in a central direction of the core particle from the interface, more specifically, 0% to 30% from the interface in contact with the surface treatment layer. The content of B element may have a concentration gradient that gradually decreases from the surface of the core toward the center of the core.

The negative electrode active material according to an embodiment of the present invention having the above-described structure and constitution exhibits an extremely lower initial pH value in comparison to a conventional case due to a decrease in contents of lithium impurities such as lithium carbonate and lithium hydroxide and an increase in the boron content at a surface of the active material. As a result, a side reaction between the negative electrode active material and an electrolyte may be suppressed, and simultaneously, the balance between lithium ion conductivity and electrical conductivity in the surface treatment layer may be improved.

Specifically, the negative electrode active material may exhibit an initial pH value of 9 to 10, more specifically, 9.3 to 9.7, and when 2 g of the negative electrode active material is titrated at pH 5 or lower, specifically, at pH 5, using 0.1 M HCl, a titrated amount may be 0.9 to 1.5 ml, more specifically, 0.9 to 1.4 ml. The side reaction between the negative electrode active material and the electrolyte may be further suppressed, and simultaneously, the balance between lithium ion conductivity and electrical conductivity in the surface treatment layer may be further improved as the titrated amount is smaller.

In the present invention, the pH of the negative electrode active material may be measure by mixing 2 g of the negative electrode active material with 100 ml of distilled water, stirring for 5 to 10 minutes, filtering, and then titrating at pH 5 or lower with an acid such as HCl. Here, soaking and decanting may be repeatedly performed to allow by-products such as lithium carbonate and lithium hydroxide in the active material to be included in the distilled water. Here, the pH of the negative electrode active material is not particularly affected much by variables such as a time at which the negative electrode active material is put into distilled water.

The negative electrode active material may have a Brunauer-Emmett-Teller (BET) specific surface area of 0.5 $m^2/g$ to 10.0 $m^2/g$.

When the BET specific surface area of the negative electrode active material exceeds 10.0 $m^2/g$, there are concerns about deterioration of dispersibility of the negative electrode active material in an active material layer due to condensation of negative electrode active materials and an increase in resistance in an electrode. When the BET specific surface area is less than 0.5 $m^2/g$, there are concerns about deterioration of dispersibility of the negative electrode active material itself and deterioration of capacity. By satisfying the above-mentioned BET specific surface area condition, the negative electrode active material according to an embodiment of the present invention may exhibit excellent capacity and charge/discharge characteristics. More specifically, the negative electrode active material may have a BET specific surface area of 3.0 $m^2/g$ to 6.0 $m^2/g$.

In the present invention, the specific surface area of the negative electrode active material is measured by a BET method. Specifically, the specific surface area may be calculated from a nitrogen gas absorption amount under a liquid nitrogen temperature (77K) using BELSORP-mini II of BEL Japan company.

The negative electrode active material according to an embodiment of the present invention having the above structure may be fabricated by a fabricating method that includes a step of forming, on a surface of a core, a surface treatment layer including a boron-containing lithium oxide at an amount that allows a boron content to have a molar ratio of 0.002 to 0.02 with respect to 1 mole of a lithium titanium oxide by treating a surface of the core including the lithium titanium oxide with a precursor of the boron-containing lithium oxide and then heat-treating at 350° C. to 450° C. Accordingly, according to another embodiment of the present invention, a method of fabricating the above-described negative electrode active material is provided.

Specifically, in the fabricating method, the core including the lithium titanium oxide is the same as that described above and may be fabricated in accordance with a common fabricating method.

The precursor of the boron-containing lithium oxide may be a boron-containing lithium oxide or a material capable of forming a boron-containing lithium oxide by reacting by a subsequent heat treatment process.

Specifically, examples of the precursor of the boron-containing lithium oxide may include boric acid such as $H_3BO_3$; boron oxide such as $B_2O_3$ and $B_2O_5$; and boron-containing lithium oxides including a lithium borate salt such as $LiBO_3$, $Li_2B_4O_7$, $LiB_3O_5$, $LiB_8O_{13}$, $Li_4B_2O_5$, $Li_3BO_3$, $Li_2B_2O_4$, and $Li_2B_6O_{10}$, and any one of the above or a mixture of two or more of the above may be used as the precursor of the boron-containing lithium oxide.

In the fabricating method, the surface treatment process related to the lithium titanium oxide may be performed by dry-mixing the core including the lithium titanium oxide and the precursor of the boron-containing lithium oxide, or in accordance with a common surface treatment process in which a composition for forming the surface treatment layer including the precursor of the boron-containing lithium oxide is sprayed, applied, or soaked on the core including the lithium titanium oxide.

For example, when the surface treatment is performed by the spraying process, the surface treatment may be performed by dissolving or dispersing the precursor of the boron-containing lithium oxide in a solvent to produce a composition for forming the surface treatment layer and then spraying the composition onto the core including the lithium titanium oxide using a common spraying device. Here, a polar solvent may be used as the solvent. Specifically, examples of the solvent may include water or alcohol having a carbon number of 1 to 8 (for example, methanol, ethanol, isopropyl alcohol, or the like), or polar organic solvents such as dimethyl sulfoxide (DMSO), N-methyl pyrrolidone (NMP), acetone, and the like, and any one of the above or a mixture of two or more of the above may be used as the solvent. The solvent may exhibit proper applicability during the surface treatment with the composition and may be included at an amount that may be easily removed during a subsequent heat treatment.

During the surface treatment process, a mixing ratio between the core including the lithium titanium oxide and the precursor of the boron-containing lithium oxide, a performance time of the surface treatment process, and the like may be properly adjusted within the range that allows the content of boron in the finally fabricated negative electrode active material to satisfy the above-mentioned content range.

During the surface treatment process, a lithium raw material capable of forming a boron-containing lithium oxide by reacting with the precursor of the boron-containing lithium oxide may selectively be further used.

Specifically, examples of the lithium raw material may include lithium hydroxide such as LiOH; a carbonate such as $Li_2CO_3$, and any one of the above or a mixture of two or more of the above may be used as the lithium raw material. The lithium raw material may be used such that the boron-containing lithium oxide in the surface treatment layer is formed at an amount that allows a boron content to have a molar ratio of 0.002 to 0.02 with respect to 1 mole of the lithium titanium oxide.

The heat treatment process is performed at 350° C. to 450° C. on the core that is surface-treated by the surface treatment process.

The $E_{barrier}$ value of the boron-containing lithium oxide forming the surface treatment layer may be adjusted by temperature at which the heat treatment is performed on the surface-treated core. When the heat treatment is performed within the above temperature range, the boron-containing lithium oxide that satisfies the above-mentioned $E_{barrier}$ value condition may be formed, and simultaneously, the rate of covering the surface of the core may be improved. When the heat treatment temperature is lower than 350° C., forming the boron-containing lithium oxide that satisfies the $E_{barrier}$ value condition and controlling the $E_{barrier}$ value are not easy, and there are concerns about deteriorations of an active material characteristic and battery characteristic due to an occurrence of a side reaction caused by an unreacted precursor material and residual solvent component. When the heat treatment temperature exceeds 450° C., there is a concern about deterioration of the effect of preventing electrolyte decomposition due to a decrease in a rate at which the surface treatment layer covers the core particle caused by recrystallization of the generated boron-containing lithium oxide, and there is a concern about an occurrence of a side reaction due to high-temperature heat. More specifically, the heat treatment process may be performed at 400° C. to 450° C.

The heat treatment process may be performed in multiple steps within the above-mentioned temperature range. Here, the heat treatment process may be performed by increasing temperature in accordance with a progress of each of the steps.

The heat treatment process may be performed in an air atmosphere or an oxygen atmosphere (for example, $O_2$ or the like), and more specifically, may be performed under an oxygen atmosphere at an oxygen partial pressure of 20 vol % or higher. The heat treatment process may be performed for 5 hours to 48 hours or for 10 hours to 20 hours under the above conditions.

By the heat treatment process, the surface treatment layer including the boron-containing lithium oxide that satisfies the above-mentioned $E_{barrier}$ value range at an optimum content is formed on the core including the lithium titanium oxide. Due to its unique structure and compositional features, the fabricated negative electrode active material may exhibit an excellent capacity recovery rate. Also, the negative electrode active material may improve the output characteristic by preventing a decrease in resistance due to a lithium by-product generated in a process of fabricating the core, may reduce gas generation by the surface treatment layer preventing electrolyte decomposition, and particularly, may reduce electrolyte decomposition and gas generation due to elution of titanium ions ($Ti^{4+}$) at a low state of charge (SOC).

Accordingly, according to still another embodiment of the present invention, a negative electrode and a lithium secondary battery including the above-described negative electrode active material are provided.

In the lithium secondary battery, the negative electrode includes a negative electrode current collector and a negative electrode active material layer located on the negative electrode current collector.

In the negative electrode, the negative electrode current collector is not particularly limited as long as the negative electrode current collector does not cause a chemical change to a battery and has high conductivity, and for example, copper, stainless steel, aluminum, nickel, titanium, sintered carbon, or a copper or stainless steel whose surface is treated with carbon, nickel, titanium, silver, and the like, an aluminum-cadmium alloy etc. may be used as the negative electrode current collector. Generally, the negative electrode current collector may have a thickness of 3 to 500 µm, and, like a positive electrode current collector, an adhesive force of the negative electrode active material may be improved by forming fine irregularities on a surface of the current collector. For example, the negative electrode current collector may be used in various forms such as a film, a sheet, a foil, a net, a porous body, a foam body, and a nonwoven fabric body.

In the negative electrode, in addition to the above-described negative electrode active material, the negative electrode active material layer may selectively further include a binder and a conductive material. Except for the use of the above-described negative electrode active material, the negative electrode may be fabricated in accordance with a common method of fabricating a negative electrode.

Specifically, the negative electrode may be fabricated by applying a composition for forming a negative electrode that includes the negative electrode active material and selectively includes the binder and the conductive material on the negative electrode current collector and then drying, or by casting the composition for forming the negative electrode on a separate support body and then laminating a film obtained by separation from the support body on the negative electrode current collector.

Here, the conductive material is used to impart conductivity to an electrode, and in a constituted battery, any conductive material can be used without particular limitation as long as the conductive material does not cause a chemical change and has electron conductivity. Specific examples include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; conductive whisker such as zinc oxide and potassium titanate; a conductive metal oxide such as titanium oxide; a conductive polymer such as a polyphenylene derivative, or the like, and any one or a mixture of two or more selected therefrom may be used as the conductive material. Generally, the conductive material may be included at 1 to 30 wt % with respect to a total weight of the negative electrode active material layer.

The binder performs a role of improving adhesion between negative electrode active material particles and an adhesive force between the negative electrode active material and the current collector. Specific examples thereof include polyvinylidene fluoride (PVDF), a PVDF-hexafluoropropylene copolymer (PVDF-co-HFP), polyvinyl alcohol, polyacrylonitrile, carboxymethyl cellulose (CMC), starch, hydroxypropylcellulose, regenerated cellulose, polyvinyl pyrrolidone, tetrafluoroethylene, polyethylene, polypropylene, an ethylene-propylene-diene monomer (EPDM), a sulfonated EPDM, styrene butadiene rubber (SBR), fluororubber, or various copolymers thereof, and one or a mixture of two or more selected therefrom may be used as the binder. The binder may be included at 1 to 30 wt % with respect to the total weight of the negative electrode active material layer.

A solvent that is usable during the fabrication of the composition for forming the negative electrode may be a solvent that is generally used in the art, examples of the solvent may include dimethyl sulfoxide (DMSO), isopropyl alcohol, N-methyl pyrrolidone (NMP), acetone, or water, and one or a mixture of two or more selected therefrom may be used as the solvent. A use amount of the solvent is sufficient as long as the solvent has a viscosity capable of allowing the negative electrode active material, the conductive material, and the binder to be dissolved or dispersed and exhibiting excellent thickness uniformity when applied later for fabricating a negative electrode in consideration of a thickness of an applied slurry and a fabrication yield.

Applying the composition for forming the negative electrode on the negative electrode current collector may be performed by a common slurry coating method. Specifically, examples of the slurry coating method may include bar coating, spin coating, roll coating, slot die coating, spray coating, or the like, and any one or two or more of the above may be performed in combination. Also, when applying the composition for forming the negative electrode, it may be preferable to apply the composition for forming the negative electrode with a proper thickness in consideration of a loading amount and thickness of the active material in the finally fabricated negative electrode active material layer.

A process of drying a paint film of the composition for forming the negative electrode formed on the negative electrode current collector, which is performed after the application process, may be performed by methods such as evaporating the solvent in the composition for forming the negative electrode, removing moisture included in the negative electrode as much as possible, and at the same time, heating or injecting hot air at temperature at which an adhesive force of the binder may be increased. Specifically, the drying process may be performed at temperature equal to or above a boiling point of the solvent and equal to or below a melting point of the binder, more specifically, at 100° C. to 150° C. More preferably, the drying process may be performed for 1 to 50 hours at temperature of 100° C. to 120° C. at a pressure of 10 torr or lower.

A rolling process, which is performed after the drying process, may be performed in accordance with a common method.

By including the above-described negative electrode active material in the negative electrode active material layer, the negative electrode may exhibit an excellent output characteristic and reduce gas generation by preventing electrolyte decomposition.

According to yet another embodiment of the present invention, an electrochemical device including the negative electrode is provided. Specifically, the electrochemical device may be a battery, a capacitor, and the like, and more specifically, may be a lithium secondary battery.

Specifically, the lithium secondary battery includes a positive electrode, a negative electrode disposed opposite the positive electrode, a separator interposed between the positive electrode and the negative electrode, and an electrolyte, and the negative electrode is the same as that described above. Also, the lithium secondary battery may selectively further include a battery container configured to store an electrode assembly including the positive electrode, the negative electrode, and the separator, and a sealing member configured to seal the battery container.

Specifically, the positive electrode includes a positive electrode current collector and a positive electrode active material layer formed on the positive electrode current collector and including the above-described positive electrode active material.

The positive electrode current collector is not particularly limited as long as the positive electrode current collector does not cause a chemical change to a battery and has conductivity, and for example, stainless steel, aluminum, nickel, titanium, sintered carbon, or an aluminum or stainless steel whose surface is treated with carbon, nickel, titanium, silver, or the like may be used as the positive electrode current collector. Generally, the positive electrode current collector may have a thickness of 3 to 500 µm, and an adhesive force of a positive electrode active material may be improved by forming fine irregularities on a surface of the current collector. For example, the positive electrode current collector may be used in various forms such as a film, a sheet, a foil, a net, a porous body, a foam body, and a nonwoven fabric body.

In the positive electrode active material layer, a compound capable of reversible intercalation and deintercalation of lithium (a lithiated intercalation compound) may be used as the positive electrode active material.

Specifically, the positive electrode active material may be a lithium transition metal oxide including a transition metal including cobalt, manganese, nickel, aluminum, or the like and lithium. Specifically, examples of the lithium transition metal oxide may include a lithium-manganese-based oxide (for example, $LiMnO_2$, $LiMn_2O$, or the like), a lithium-cobalt-based oxide (for example, $LiCoO_2$ or the like), a lithium-nickel-based oxide (for example, $LiNiO_2$, or the like), a lithium-nickel-manganese based oxide (for example, $LiNi_{1-Y}Mn_YO_2$ (here, $0<Y<1$), $LiMn_{2-Z}Ni_ZO_4$ (here, $0<Z<2$, or the like)), a lithium-nickel-cobalt based oxide (for example, $LiNi_{1-Y}Co_YO_2$ (here, $0<Y<1$)), a lithium-manganese-cobalt based oxide (for example, $LiCo_{1-Y}Mn_YO_2$ (here, $0<Y<1$), $LiMn_{2-Z}Co_ZO_4$ (here, $0<Z<2$, or the like)), a lithium-nickel-manganese-cobalt-based oxide (for example, $Li(Ni_PCo_QMn_R)O_2$ (here, $0<P<1$, $0<Q<1$, $0<R<1$, $P+Q+R=1$) or $Li(Ni_PCo_QMn_R)O_4$ (here, $0<P<2$, $0<Q<2$, $0<R<2$, $P+Q+R=2$)), a lithium-nickel-cobalt-transition metal (M) oxide (for example, $Li(Ni_PCo_QMn_RM_S)O_2$ (here, M is selected from the group consisting of Al, Fe, V, Cr, Ti, Ta, Mg, and Mo, P, Q, R, and S are atomic fractions of independent elements, and $0<P<1$, $0<Q<1$, $0<R<1$, $0<S<1$, $P+Q+R+S=1$), or the like, and the lithium transition metal oxide may be doped with tungsten (W) or niobium (Nb). More specifically, in terms of being able to improve a capacity characteristic and stability of a battery, the lithium transition metal oxide may include $LiCoO_2$, $LiMnO_2$, $LiNiO_2$, a lithium-nickel-manganese-cobalt oxide (for example, $Li(Ni_{0.6}Mn_{0.2}Co_{0.2})O_2$, $LiNi_{0.5}Mn_{0.3}Co_{0.2}O_2$, $LiNi_{0.8}Mn_{0.1}Co_{0.1}O_2$, or the like), a lithium-nickel-cobalt-aluminum oxide (for example, $LiNi_{0.8}Co_{0.15}Al_{0.05}O_2$, or the like), and any one of the above or a mixture of two or more of the above may be used as the lithium transition metal oxide.

The positive electrode may be fabricated in accordance with a common method of fabricating a positive electrode. Specifically, the positive electrode may be fabricated by applying a composition for forming a positive electrode, which is fabricated by dissolving the positive electrode active material, the conductive material, and the binder in a solvent, on the positive electrode current collector and then drying and rolling.

In the lithium secondary battery, the separator separates the negative electrode and the positive electrode and provides a migration path for lithium ions, and anything that is generally used as a separator in a lithium secondary battery may be used without particular limitation. Particularly, it is preferable that the separator have low resistance with respect to ion migration in an electrolyte and have excellent ability of impregnating an electrolyte. Specifically, a porous polymer film, for example, a porous polymer film fabricated with a polyolefin-based polymer such as an ethylene homopolymer, a propylene homopolymer, an ethylene-butene copolymer, an ethylene-hexene copolymer, and an ethylene-methacrylate copolymer or a stacked structure of two or more layers thereof may be used. Also, a general porous nonwoven fabric, for example, a nonwoven fabric formed of high-melting-point glass fiber, polyethylene terephthalate fiber, or the like may be used. A coated separator including a ceramic component or a polymer material for securing heat resistance or mechanical strength may be used, and may selectively be used in a single-layer or multi-layer structure.

Examples of an electrolyte used in the present invention may include an organic liquid electrolyte, an inorganic liquid electrolyte, a solid polymer electrolyte, a gel-type polymer electrolyte, an inorganic solid electrolyte, and a molten-type inorganic electrolyte, but are not limited thereto.

Specifically, the electrolyte may include an organic solvent and a lithium salt.

Anything that can serve as a medium through which ions involved in an electrochemical reaction of a battery may migrate may be used as the organic solvent without particular limitation. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethylcarbonate (DMC), diethylcarbonate (DEC), methylethylcarbonate (MEC), ethylmethylcarbonate (EMC), ethylene carbonate (EC), and propylene carbonate (PC); an alcohol-based solvent such as ethyl alcohol and isopropyl alcohol; nitriles such as R—CN (R is a linear, branched, or cyclic hydrocarbon group of C2 to C20, and may include a double bond aromatic ring or an ether bond); amides such as dimethylformamide; dioxolanes such as 1,3-dioxolane; or sulfolane may be used as the organic solvent. Among these, the carbonate-based solvent is preferable, and a mixture of a cyclic carbonate (for example, EC or PC) having high ion conductivity and a high dielectric constant capable of improving the charge/discharge performance of a battery and a linear carbonate-based compound (for example, EMC, DMC, or DEC) having a low viscosity is more preferable. In this case, excellent performance of an electrolyte may be exhibited when the cyclic carbonate and the chain carbonate are mixed in a volume ratio of about 1:1 to 1:9 and used.

Any compound capable of providing lithium ions used in a lithium secondary battery may be used as the lithium salt without particular limitation. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. The concentration of the lithium salt is preferably in the range of 0.1 M to 2.0 M. When the concentration of the lithium salt is within the above range, because the electrolyte has an appropriate conductivity and viscosity, the electrolyte can exhibit excellent electrolyte performance, and the lithium ions can effectively migrate.

For purposes of improving a lifespan characteristic of a battery, suppressing a decrease in battery capacity, improving a discharge capacity of a battery, and the like, for example, the electrolyte may further include one or more additives such as haloalkylene carbonate-based compound such as difluoroethylene carbonate or the like, pyridine, triethyl phosphite, triethanolamine, cyclic ether, ethylenediamine, n-glyme, hexaphosphate triamide, a nitrobenzene derivative, sulfur, quinone imine dyes, N-substituted oxazolidinone, N,N-substituted imidazolidine, ethylene glycol dialkyl ether, ammonium salt, pyrrole, 2-methoxyethanol, aluminum trichloride, or the like in addition to the components of the electrolyte. Here, the additive may be included at 0.1 to 5 wt % with respect to the total weight of the electrolyte.

Due to stably exhibiting an excellent discharge capacity, output characteristic, and capacity retention rate, the lithium secondary battery including the positive electrode active material according to the present invention is useful for portable devices such as a mobile phone, a laptop computer, and a digital camera and in the electric vehicle field including a hybrid electric vehicle (HEV).

Accordingly, according to another implementation of the present invention, a battery module including the lithium secondary battery as a unit cell and a battery pack including the same are provided.

The battery module or battery pack may be used as a power source of a medium to large sized device of one or more of a power tool; an electric car including an electric vehicle (EV), a hybrid electric vehicle, and a plug-in hybrid electric vehicle (PHEV); or a power storage system.

[Mode]

Hereinafter, an embodiment of the present invention will be described in detail so that one of ordinary skill in the art to which the present invention pertains can easily practice the present invention. However, the present invention may be implemented in various other forms and is not limited to the embodiment described herein.

Example 1

Fabrication of Negative Electrode Active Material $Li_4Ti_5O_{12}$ in the form of a second particle (average particle size ($D_{50}$) of a primary particle: 500 nm, average particle size ($D_{50}$) of the secondary particle: 8 μm) was surface-treated using a composition produced by mixing $Li_2B_4O_7$ in isopropyl alcohol, and a heat treatment was performed for 5 hours at 400° C. under an atmosphere (here, $Li_2B_4O_7$ was used at a content that allows a molar ratio of B to be 0.005 with respect to 1 mole of $Li_4Ti_5O_{12}$). By this method, a negative electrode active material in which a surface treatment layer including $LiBO_2$ and $Li_2B_4O_7$ is formed on a surface of $Li_4Ti_5O_{12}$ was fabricated.

Example 2

Fabrication of Negative Electrode Active Material

A negative electrode active material in which a surface treatment layer including $LiBO_2$ and $LiB_3O_5$ is formed on a surface of $Li_4Ti_5O_{12}$ was fabricated by performing the same method as in Example 1 above except for the use of $LiB_3O_5$ instead of $Li_2B_4O_7$.

Example 3

Fabrication of Negative Electrode Active Material

A negative electrode active material in which a surface treatment layer including $LiBO_2$ and $Li_2B_4O_7$ is formed on a surface of $Li_4Ti_5O_{12}$ was fabricated by performing the same method as in Example 1 above except for the use of $Li_2B_4O_7$ at a content that allows a molar ratio of B to be 0.01 with respect to 1 mole of $Li_4Ti_5O_{12}$.

Example 4

Fabrication of Negative Electrode Active Material $Li_4Ti_5O_{12}$ in the form of a second particle (average particle size ($D_{50}$) of a primary particle: 500 nm, average particle size ($D_{50}$) of the secondary particle: 8 μm) was surface-treated using a composition produced by mixing 5,000 ppm of $Li_2B_4O_7$ in isopropyl alcohol, and a heat treatment was performed for 5 hours at 400° C. under an atmosphere. By this method, a negative electrode active material in which 5,000 ppm of B is included at on a surface of $Li_4Ti_5O_{12}$ with respect to a total weight of $Li_4Ti_5O_{12}$ was fabricated.

Comparative Example 1

Fabrication of Negative Electrode Active Material $Li_4Ti_5O_{12}$ in the form of a second particle (average particle size ($D_{50}$) of a primary particle: 500 nm, average particle size ($D_{50}$) of the secondary particle: 8 μm), whose surface was not treated, was used as a negative electrode active material.

Comparative Example 2

Fabrication of Negative Electrode Active Material

A negative electrode active material in which a surface treatment layer including $Al_2O_3$ is formed on a surface of $Li_4Ti_5O_{12}$ was fabricated by performing the same method as in Example 1 above except for the use of $Al_2O_3$ instead of $Li_2B_4O_7$ at a content that allows a molar ratio of Al to be 0.005 with respect to 1 mole of $Li_4Ti_5O_{12}$.

Comparative Example 3

Fabrication of Negative Electrode Active Material

A negative electrode active material in which a surface treatment layer including $AlF_3$ is formed on a surface of $Li_4Ti_5O_{12}$ was fabricated by performing the same method as in Example 1 above except for the use of $AlF_3$ instead of $Li_2B_4O_7$ at a content that allows a molar ratio of Al to be 0.005 with respect to 1 mole of $Li_4Ti_5O_{12}$.

Comparative Example 4

Fabrication of Negative Electrode Active Material

A negative electrode active material in which a surface treatment layer including $LiBO_2$ is formed on a surface of $Li_4Ti_5O_{12}$ was fabricated by performing the same method as in Example 1 above except for the use of $LiBO_2$ instead of $Li_2B_4O_7$.

Comparative Example 5

Fabrication of Negative Electrode Active Material

A negative electrode active material in which a surface treatment layer including $LiBO_2$ and $Li_2B_4O_7$ is formed on a surface of $Li_4Ti_5O_{12}$ was fabricated by performing the same method as in Example 1 above except for the use of $Li_2B_4O_7$ at a content that allows a molar ratio of B to be 0.001 with respect to 1 mole of $Li_4Ti_5O_{12}$.

Comparative Example 6

Fabrication of Negative Electrode Active Material

A negative electrode active material in which a surface treatment layer including $Al_2O_3$ is formed on a surface of $Li_4Ti_5O_{12}$ was fabricated by performing the same method as in Example 1 above except for the use of $Al_2O_3$ instead of $Li_2B_4O_7$ at a content that allows a molar ratio of Al to be 0.003 with respect to 1 mole of $Li_4Ti_5O_{12}$.

Comparative Example 7

Fabrication of Negative Electrode Active Material

A negative electrode active material in which a surface treatment layer including $Al_2O_3$ is formed on a surface of $Li_4Ti_5O_{12}$ was fabricated by performing the same method as in Example 1 above except for the use of $Al_2O_3$ instead of $Li_2B_4O_7$ at a content that allows a molar ratio of Al to be 0.004 with respect to 1 mole of $Li_4Ti_5O_{12}$.

Comparative Example 8

Fabrication of Negative Electrode Active Material

The negative electrode active material fabricated in Comparative Example 1 was put in 100 ml of water, stirred for 5 minutes, and washed to be used as a negative electrode active material.

Comparative Example 9

Fabrication of Negative Electrode Active Material $Li_4Ti_5O_{12}$ in the form of a second particle (average particle size ($D_{50}$) of a primary particle: 500 nm, average particle size ($D_{50}$) of the secondary particle: 8 μm) was surface-treated using a composition produced by mixing 300 ppm of $Li_2B_4O_7$ in isopropyl alcohol, and a heat treatment was performed for 5 hours at 400° C. under an atmosphere. By this method, a negative electrode active material in which a surface treatment layer including $LiBO_2$ and $Li_2B_4O_7$ is formed on a surface of $Li_4Ti_5O_{12}$ was fabricated, and a negative electrode active material in which 300 ppm of B is included with respect to a total weight of $Li_4Ti_5O_{12}$ was fabricated.

Comparative Example 10

Fabrication of Negative Electrode Active Material $Li_4Ti_5O_{12}$ in the form of a second particle (average particle size ($D_{50}$) of a primary particle: 500 nm, average particle size ($D_{50}$) of the secondary particle: 8 μm) was surface-treated using a composition produced by adding 500 ppm of $Li_2B_4O_7$ in isopropyl alcohol, and a heat treatment was performed for 5 hours at 400° C. under an atmosphere. By this method, a negative electrode active material in which a surface treatment layer including $LiBO_2$ and $Li_2B_4O_7$ is formed on a surface of $Li_4Ti_5O_{12}$ was fabricated, and a negative electrode active material in which 500 ppm of B is included with respect to a total weight of $Li_4Ti_5O_{12}$ was fabricated.

Comparative Example 11

Fabrication of Negative Electrode Active Material

A negative electrode active material in which a surface treatment layer including $LiBO_2$ and $Li_2B_4O_7$ is formed on a surface of $Li_{0.8}Ti_{2.2}O_4$ was fabricated using the same method as in Example 1 above except for performing the heat treatment for 5 hours at 500° C.

FABRICATION EXAMPLE

Fabrication of Lithium Secondary Battery

A lithium secondary battery was fabricated using each of the negative electrode active materials fabricated in Examples 1 to 4 above.

Specifically, each of the negative electrode active materials fabricated in Examples 1 to 4 above, carbon black as a conductive material, and PVdF as a binder were mixed in a weight ratio of 85:10:5 in an N-methylpyrrolidone (NMP) solvent to fabricate a composition for forming a negative electrode (viscosity: 5,000 mPa·s), and a Cu foil was coated with the composition at a loading amount of 2.6 mAh/cm$^3$ and then dried with a heat treatment at 120° C. and then rolled to fabricate a negative electrode.

Also, $Li(Ni_{0.6}Mn_{0.2}Co_{0.2})O_2$ as a positive electrode active material, carbon black as a conductive material, and PVdF as a binder were mixed in a weight ratio of 90:5:5 in an NMP solvent to fabricate a composition for forming a positive electrode (viscosity: 5,000 cps), the composition was applied on an aluminum current collector, dried and then rolled to fabricate a positive electrode.

A porous polyethylene separator was interposed between the positive electrode and the negative electrode fabricated as above to fabricate an electrode assembly, the electrode assembly was placed inside a case, and then an electrolyte was injected into the case to fabricate a lithium secondary battery. Here, the electrolyte was fabricated by dissolving lithium hexafluorophosphate (LiPF$_6$) at a concentration of 1.0 M in an organic solvent consisting of EC/DMC/EMC in a mixing volume ratio of 3:4:3.

The same method was performed also for each of the negative electrode active materials fabricated in Comparative Examples 1 to 11 to fabricate a negative electrode and a lithium secondary battery including the same.

Experimental Example 1

Analysis of Negative Electrode Active Materials

With respect to each of the negative electrode active materials fabricated in Examples 1 and 2 and Comparative Examples 2 to 5 and 11, an $E_{barrier}$ value and a bandgap of a material forming a surface treatment layer, an $E_{barrier}$ value of the surface treatment layer, and a content of a metal element (B or Al) forming the surface treatment layer were measured.

Specifically, the $E_{barrier}$ value was obtained through a first principle calculation using the Vienna Ab initio simulation package (VASP) program.

The bandgap was measured using cyclic voltammetry.

The content of B included in the surface treatment layer of the negative electrode active material was analyzed using an inductively coupled plasma atomic emission spectroscopy (ICP-AES) method.

Specifically, 0.1 g of a negative electrode active material to be measured was taken, 2 ml of distilled water and 3 ml of concentrated nitric acid were added thereto, and a sample was dissolved in the solution while the solution was covered. Then, when the sample was completely dissolved, 50 ml of ultrapure water was added to the solution to dilute the solution. Then, the diluted solution was diluted again by a factor of 10 and then analyzed using ICP-AES. Here, the ICP-AES (5300 DV, Perkinelemer) was operated in the following conditions:

Forward power of 1300 W; a torch height of 15 mm; a plasma gas flow at 15.00 L/min; a sample gas flow at 0.8 L/min; an auxiliary gas flow at 0.20 L/min; and a pump speed of 1.5 ml/min.

Results thereof are shown in Tables 1 and 2 below.

TABLE 1

|  | $E_{barrier}$ value (eV) | Bandgap (eV) |
| --- | --- | --- |
| $Li_2B_4O_7$ | 0.15 | 8.9 to 10.1 |
| $LiB_3O_5$ | 0.05 | — |
| $Al_2O_3$ | 5.44 | up to 8.8 |
| $AlF_3$ | 0.34 | up to 10.8 |
| $LiBO_2$ | 0.45 | — |
| $Li_2B_4O_7$ | 0.15 | 8.9 to 10.1 |

TABLE 2

|  | Surface treatment layer forming material | $E_{barrier}$ value (eV) | Content of B (molar ratio with respect to 1 mole of LTO) |
| --- | --- | --- | --- |
| Example 1 | $LiBO_2$, $Li_2B_4O_7$ | 0.30 | 0.005 |
| Example 2 | $LiBO_2$, $LiB_3O_5$ | 0.25 | 0.005 |
| Comparative Example 2 | $Al_2O_3$ | 5.44 | 0.005 |
| Comparative Example 3 | $AlF_3$ | 0.34 | 0.005 |
| Comparative Example 4 | $LiBO_2$ | 0.45 | 0.005 |
| Comparative Example 5 | $Li_2B_4O_7$ | 0.15 | 0.001 |
| Comparative Example 11 | $LiBO_2$, $Li_2B_4O_7$ | 0.40 | 0.005 |

As a result of the experiment, it can be confirmed that the surface treatment layers of the negative electrode active materials of Examples 1 and 2 have $E_{barrier}$ values significantly lower in comparison to the surface treatment layers of Comparative Examples 2 to 5 and 11 and thus have superior lithium ion conductivity.

Experimental Example 2

Observation of Structures of Negative Electrode Active Materials

Figure 4:
FIG. 4 is a photograph of a negative electrode active material fabricated in Example 1 observed with a scanning electron microscope.
Figure 5:
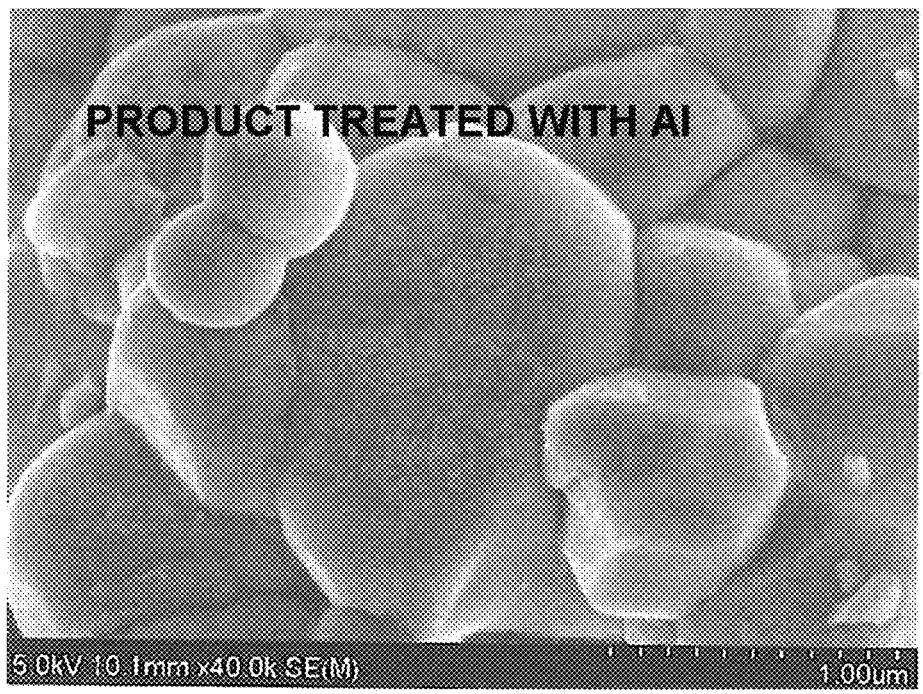
FIG. 5 is a photograph of a negative electrode active material fabricated in Comparative Example 2 observed with a scanning electron microscope.

The negative electrode active materials of Example 1 and Comparative Example 2 were processed using ion milling and observed using a scanning electron microscope (SEM). Results thereof are shown in FIGS. 4 and 5.

As a result of the experiment, it was confirmed that a B-including surface treatment layer was uniformly formed on a surface of a core in the case of a negative electrode active material fabricated in Example 1, and an Al-including coating layer was partially formed on a surface of a core in the case of a negative electrode active material fabricated in Comparative Example 2.

Experimental Example 3 pH Titration Experiment

When fabricating a negative electrode active material including a surface treatment layer according to the present invention, pH titration was performed to examine a change in an amount of lithium impurities in accordance with a content of B included in the surface treatment layer.

Specifically, with respect to 2 g of the negative electrode active materials of Examples 1 and 3 in which a molar ratio of B included in the surface treatment layer was 0.005 and 0.01, respectively, with respect to 1 mole of $Li_4Ti_5O_{12}$, pH changes were recorded by titrating 0.02 ml of 0.1 M HCl each time using a pH meter (metrohm 794). Here, pH was recorded also for the negative electrode active materials of Comparative Examples 1 and 5 to 8 for comparison. A result thereof is shown in FIG. 6.

Figure 6:
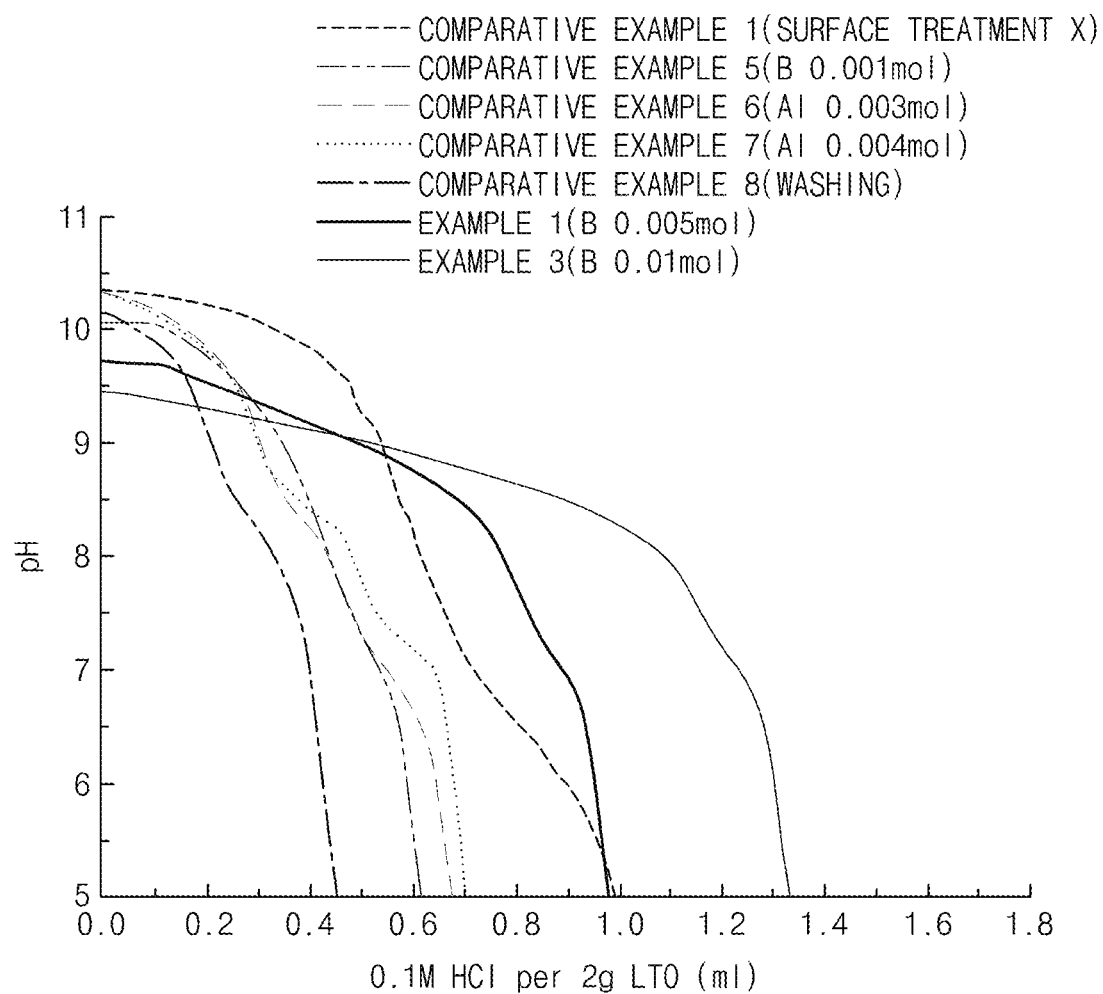
FIG. 6 is a graph showing a result of comparing reduction amounts of lithium impurities in negative electrode active materials of Examples 1, 3 and Comparative Examples 1 and 5 to 8.

FIG. 6 is a graph showing a result of comparing reduction amounts of lithium impurities in the negative electrode active materials of Examples 1, 3 and Comparative Examples 1 and 5 to 8.

As a result of the experiment, it was confirmed that the negative electrode active materials of Examples 1 and 3 had pH of 9 to 10 and had lower initial pH in comparison to Comparative Examples 1 and 5 to 8 and did not exhibit a conventional open form due to by-products.

Experimental Example 4

Figure 7:
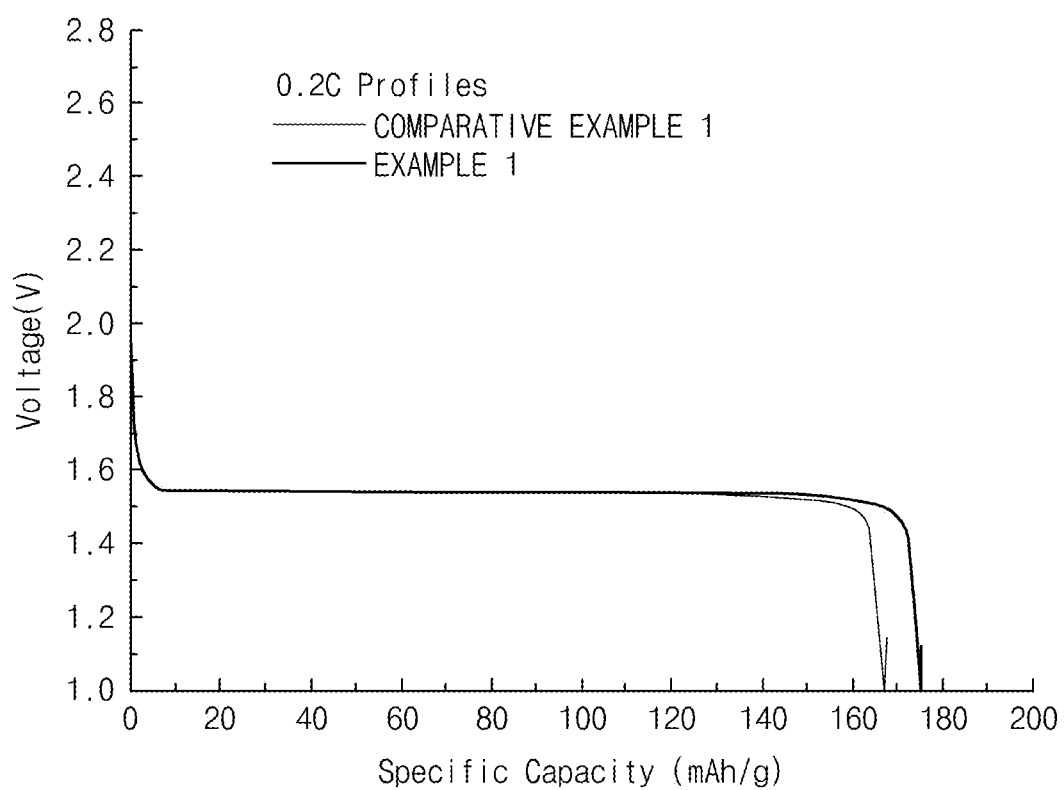
FIG. 7 is a graph showing a result of measuring an initial discharge capacity at 0.2 C with respect to negative electrode active materials of Example 1 and Comparative Example 1.
Figure 8:
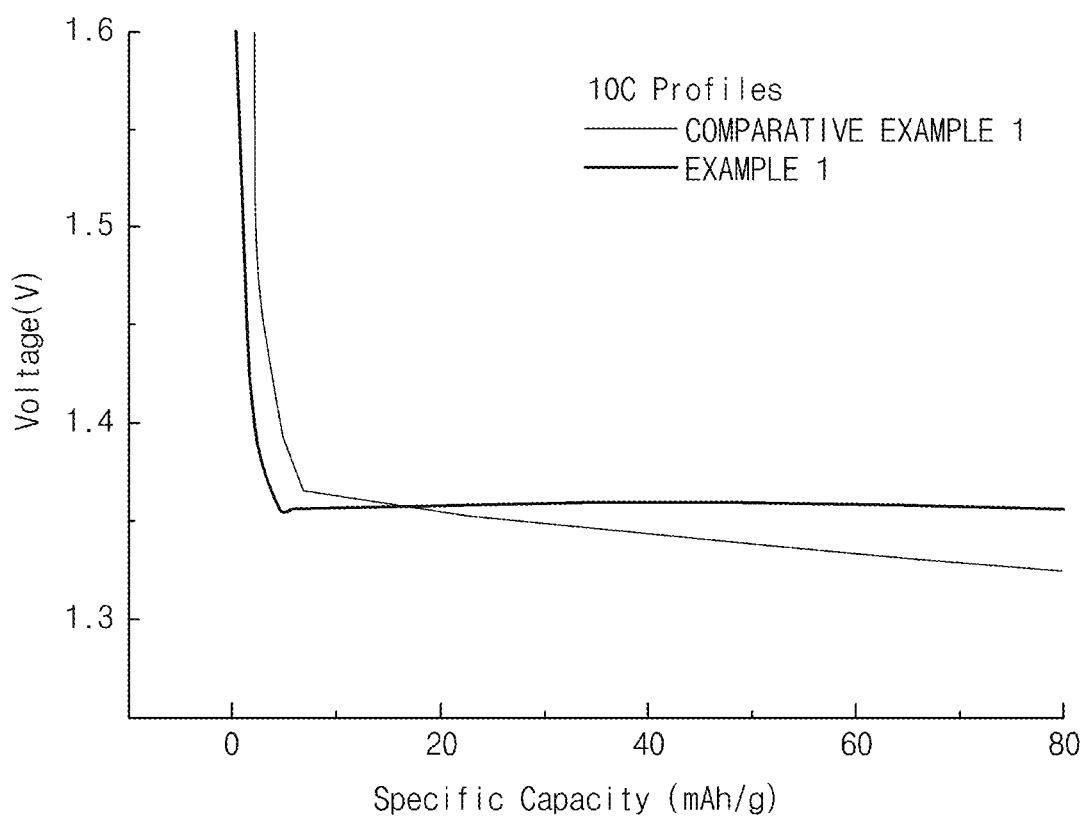
FIG. 8 is a graph showing a result of measuring a discharge capacity at 10 C with respect to the negative electrode active materials of Example 1 and Comparative Example 1.

Evaluation of Electrochemical Characteristics of Negative Electrode Active Materials A coin cell (using a Li-metal negative electrode) fabricated using the negative electrode active material fabricated in Example 1 was charged until a constant current (CC) of 0.2 C until 4.25 V at 25° C., and then charging at a constant voltage (CV) of 4.25 V was performed, thereby performing one-time charging until a charging current reached 0.05 mAh. Then, the coin cell was left for 20 minutes and then discharged until 3.0 V at the constant current of 0.2 C to measure a first-cycle initial discharge capacity. Then, each of charge/discharge capacity, charge/discharge efficiency, and rate capability was evaluated after changing a discharge condition to 10 C. A result thereof is shown in Table 3 below and FIGS. 7 and 8.

TABLE 3

|  | First charge/discharge Initial discharge capacity | Second charge/discharge | |
| --- | --- | --- | --- |
|  | (mAh/g, 0.2 C) | Efficiency (%) | 10 C/0.2 C (%) |
| Example 1 | 174 | 98.5 | 87.9 |
| Comparative Example 1 | 168 | 98.5 | 76.3 |

As a result of the experiment, the negative electrode active material of Example 1 having the surface treatment layer of a boron-containing lithium oxide exhibited a superior effect in terms of initial discharge capacity and rate capability in comparison to Comparative Example 1, which is a negative electrode active material of a lithium titanium oxide not having a surface treatment layer.

Experimental Example 5

Measurement of Gas Generation Amount of Lithium Secondary Battery

Figure 9:
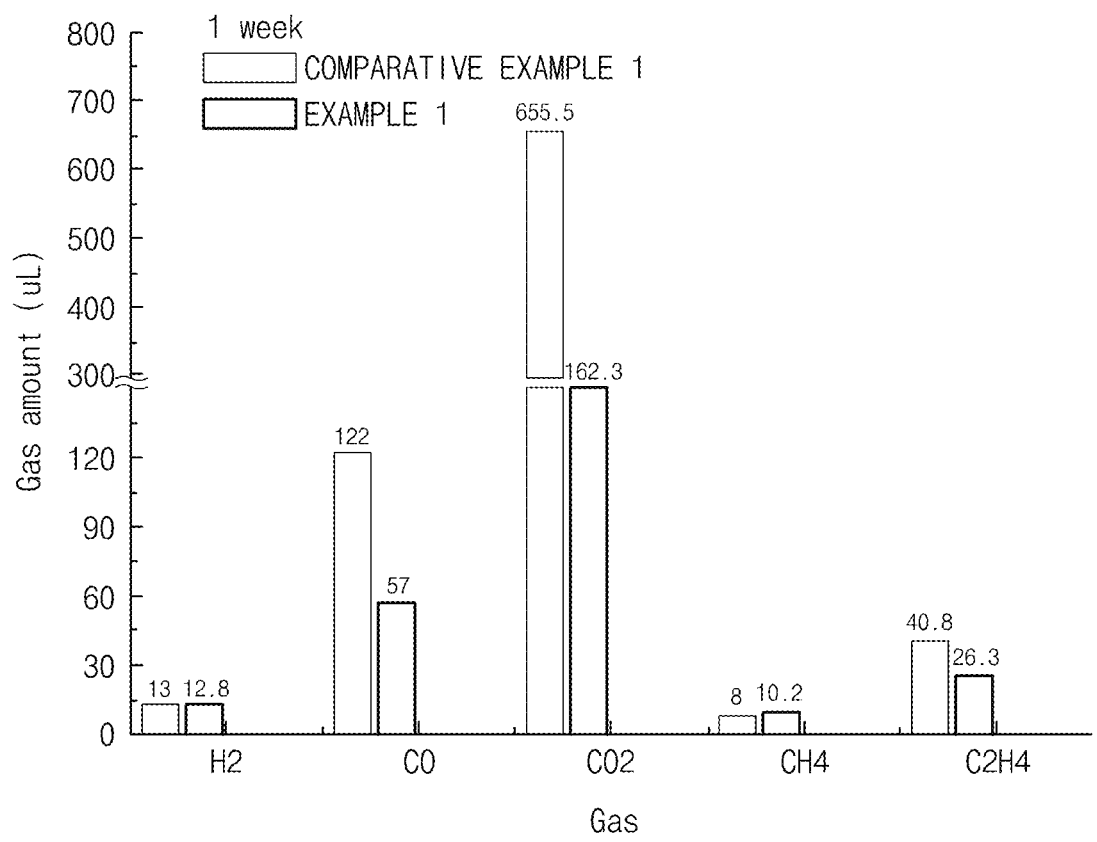
FIG. 9 is a graph showing a result of measuring a gas generation amount in a lithium secondary battery including each of the negative electrode active materials of Example 1 and Comparative Example 1.

After the negative electrode active materials of Example 1 and Comparative Example 1 were impregnated in an electrolyte, the negative electrode active materials were stored for a week at 80° C., and a type of generated gas and an amount of gas were measured. Here, the electrolyte was produced by dissolving lithium hexafluorophosphate (LiPF$_6$) at a concentration of 1.0 M in an organic solvent consisting of EC/DMC/EMC in a mixing volume ratio of 3:4:3. A result thereof is shown in FIG. 9 below.

As a result of the experiment, the negative electrode active material of Example 1 exhibited an equivalent level of gas generation amount in cases of H$_2$ and CH$_4$ but exhibited a significantly reduced gas generation amount in cases of CO, CO$_2$, and C$_2$H$_4$ in comparison to the negative electrode active material of Comparative Example 1 not having a surface treatment layer.

Figure 10:
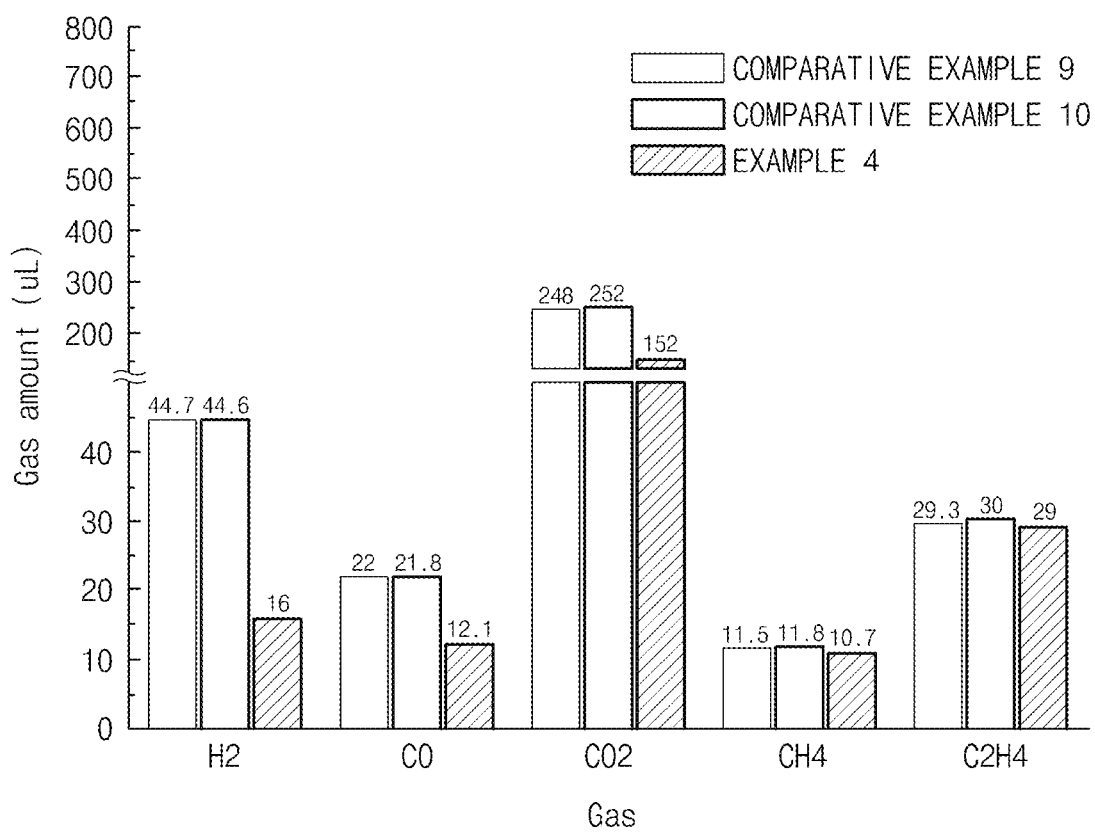
FIG. 10 is a graph showing a result of measuring a gas generation amount in a lithium secondary battery including each of negative electrode active materials of Example 4 and Comparative Examples 9 and 10.

Lithium secondary batteries including the negative electrode active materials of Example 4 and Comparative Examples 9 and 10 above were also impregnated in an electrolyte using the same method as above, stored for a week at 80° C., and a type of generated gas and an amount of gas were measured. A result thereof is shown in FIG. 10.

As a result of the experiment, the negative electrode active material of Example 4 exhibited an equivalent level of gas generation amount in cases of CH$_4$ and C$_2$H$_4$ but exhibited a significantly reduced gas generation amount in cases of H$_2$, CO, and CO$_2$ in comparison to the negative electrode active materials of Comparative Examples 9 and 10 in which a content of boron is 10 to 20 times smaller.

In the cases of Comparative Examples 9 and 10, it is considered that the effect of preventing electrolyte decomposition at a surface of a lithium titanium oxide caused by formation of a surface treatment layer including B is not achieved due to having a small content of B with respect to a total weight of the negative electrode active materials, that is, 300 ppm and 500 ppm of B with respect to the total weight of the negative electrode active materials.

Experimental Example 6

Evaluation of Capacity Recovery Rate of Lithium Secondary Battery

A lithium secondary battery including each of the negative electrode active materials of Example 1 and Comparative Example 1 was charged until a constant current of 0.1 C until 2.5 V, stored for 21 days at 80° C., and then an average discharge capacity of the second and third cycles excluding an initial discharge capacity was measured. A result thereof is shown in Table 4 below.

TABLE 4

| | Capacity recovery rate (%) |
|---|---|
| Example 1 | 95 |
| Comparative Example 1 | 88 |

As a result of the experiment, the negative electrode active material of Example 1 having the surface treatment layer of the boron-containing lithium oxide exhibited a significantly superior capacity recovery rate in comparison to Comparative Example 1.

Experimental Example 7

Evaluation of Normalized Capacity of Lithium Secondary Battery

Figure 11:
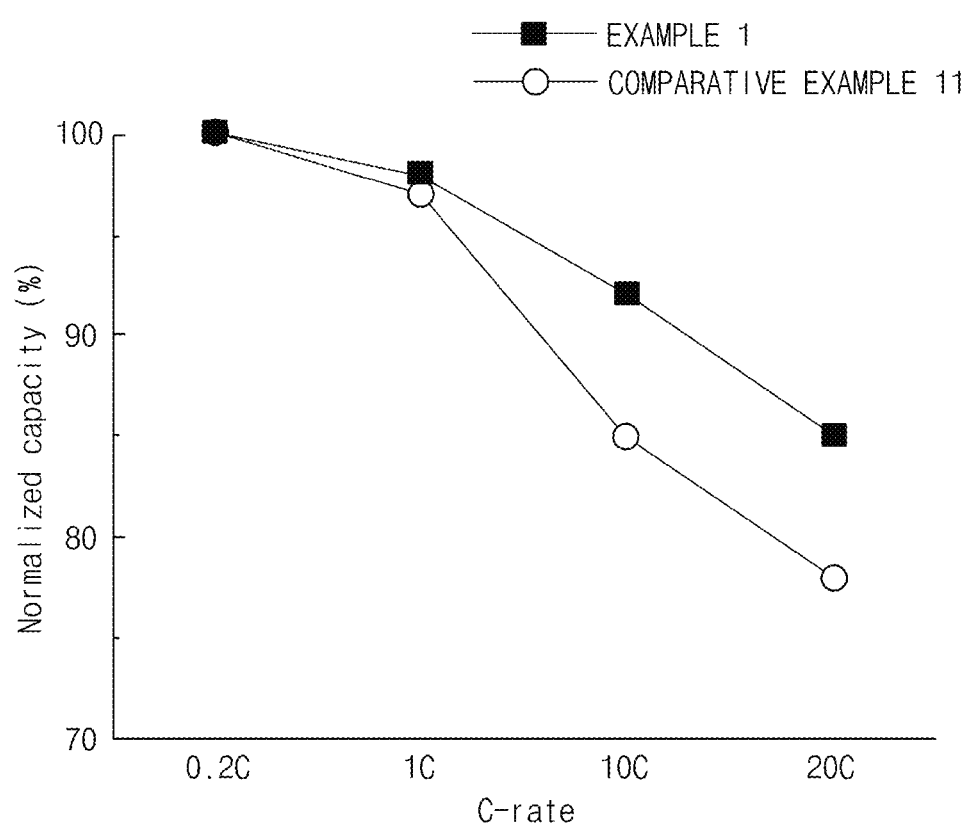
FIG. 11 is a graph showing a normalized capacity of a lithium secondary battery including each of the negative electrode active materials of Example 1 and Comparative Example 11.

A normalized capacity in accordance with a C-rate of each of the negative electrode active materials in Example 1 and Comparative Example 11 above was observed, and a result thereof is shown in FIG. 11.

C-rate in FIG. 11 refers to an amount of current required when charging/discharging for an hour in a 1 C condition. It was confirmed that resistance increased and thus a normalized capacity decreased as the amount of current increased.

Referring to FIG. 11, it was confirmed that capacity decreased as the C-rate was increased on the basis of a capacity when charging/discharging at 0.2 C of lithium secondary batteries fabricated in Example 1 and Comparative Example 1, a capacity difference therebetween increased, and when charging/discharging at 20 C, the lithium secondary battery including the negative electrode active material fabricated in Example 1 exhibited a capacity of 85% or higher, and the lithium secondary battery including the negative electrode active material fabricated in Comparative Example 11 exhibited a capacity of less than 80%.

Regarding this, in the case of the lithium secondary battery including the negative electrode active material of Example 1, an E$_{barrier}$ value of the surface treatment layer including LiBO$_2$ and Li$_2$B$_4$O$_7$ generated due to a boron source reacting with lithium by-products such as Li$_2$CO$_3$ and LiOH at 400° C. is adjusted to about 0.3 eV, conductivity of Li ions on a surface of Li$_4$Ti$_5$O$_{12}$ is increased, and thus an output characteristic is improved. Conversely, in the case of Comparative Example 11, it was confirmed that, because an E$_{barrier}$ value related to Li ion migration on the surface treatment layer including LiBO$_2$ and Li$_2$B$_4$O$_7$ formed on a surface of Li$_4$Ti$_5$O$_{12}$ by a heat treatment at 500° C. was increased, Li ion conductivity was lowered, and because resistance was increased, it was not easy to realize a capacity at a high C-rate. Also, due to being heat-treated at high temperature, it becomes difficult to cover the entire surface of Li$_4$Ti$_5$O$_{12}$ due to recrystallization of the boron-containing lithium oxide, and accordingly, the gas generation amount may also increase.

The invention claimed is:

1. A negative electrode active material for a secondary battery, the negative electrode active material comprising:
    a core that includes a lithium titanium oxide; and
    a surface treatment layer located on a surface of the core, wherein:
        the surface treatment layer includes a boron-containing lithium oxide at an amount that allows a boron content to have a molar ratio of 0.002 to 0.02 with respect to 1 mole of the lithium titanium oxide; and
        when 2 g of the negative electrode active material is titrated at pH 5 or lower using 0.1 M HCl, a titrated amount is 0.9 to 1.5 ml.

2. The negative electrode active material of claim 1, wherein the surface treatment layer includes the boron-containing lithium oxide to be 5,000 to 7,000 ppm with respect to a total weight of the lithium titanium oxide.

3. The negative electrode active material of claim 1, wherein the surface treatment layer has a lithium ion migration energy barrier value of 0.05 eV to 0.3 eV.

4. The negative electrode active material of claim 1, wherein the boron-containing lithium oxide has a bandgap value of 8.5 eV to 10.5 eV.

5. The negative electrode active material of claim 1, wherein the boron-containing lithium oxide includes any one or two or more selected from the group consisting of Li$_2$B$_4$O$_7$, LiB$_3$O$_5$, LiB$_8$O$_{13}$, Li$_4$B$_2$O$_5$, Li$_3$BO$_3$, Li$_2$B$_2$O$_4$, and Li$_2$B$_6$O$_{10}$.

6. The negative electrode active material of claim 1, wherein the surface treatment layer is formed at 80 area % or more of an entire surface area of the core.

7. The negative electrode active material of claim 1, wherein the lithium titanium oxide includes a compound of Chemical Formula 2 below:

$$Li_xTi_yM_wO_{12-z}A_z \quad \text{[Chemical Formula 2]}$$

In Chemical Formula 2 above, $0.5 \le x \le 4$, $1 \le y \le 5$, $0 \le w \le 0.17$, $0 \le z \le 0.17$, M includes one or more elements selected from the group consisting of metals of Groups 2 to 13 in the periodic table, and A is a nonmetal element having an oxidation number of −1 valence.

8. The negative electrode active material of claim 1, wherein the lithium titanium oxide comprises any one or two or more selected from the group consisting of $Li_4Ti_5O_{12}$, $Li_{0.8}Ti_{22}O_4$, $Li_{2.67}Ti_{1.33}O_4$, $LiTi_2O_4$, $Li_{1.33}Ti_{1.67}O_4$, and $Li_{1.14}Ti_{1.71}O_4$.

9. A method of fabricating the negative electrode active material for a secondary battery of claim 1, the method including a step of forming, on a surface of a core, a surface treatment layer including a boron-containing lithium oxide at an amount that allows a boron content to have a molar ratio of 0.002 to 0.02 with respect to 1 mole of a lithium titanium oxide by treating a surface of the core including the lithium titanium oxide with a precursor of the boron-containing lithium oxide and then heat-treating at 350° C. to 450° C.

10. A negative electrode for a secondary battery comprising the negative electrode active material of claim 1.

11. A lithium secondary battery comprising the negative electrode of claim 10.

* * * * *